March 8, 1960
A. E. H. ELMER
2,927,750
POWER OPERATED AIRCRAFT CONTROLS
Filed Nov. 28, 1955
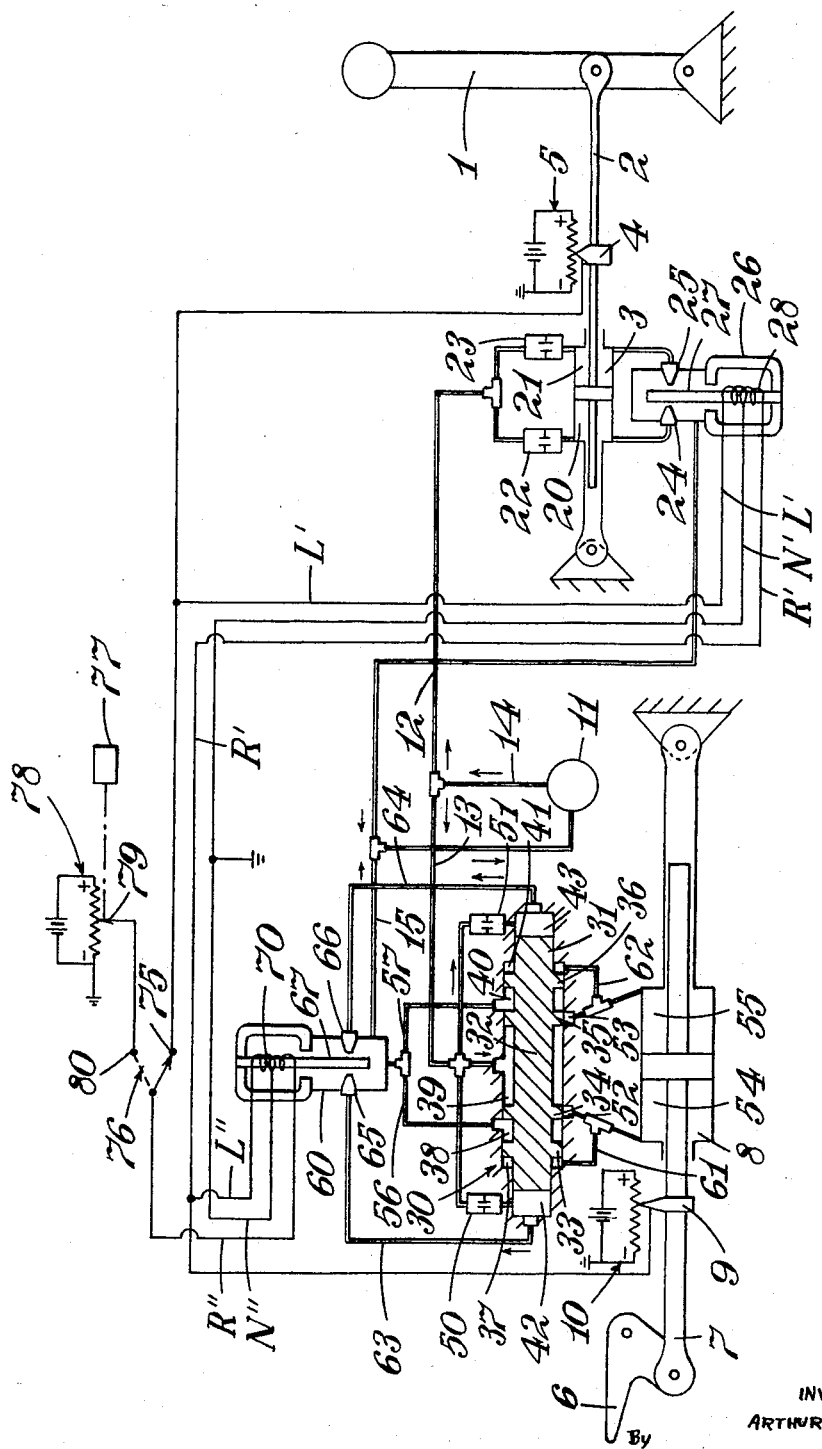
INVENTOR
ARTHUR E.H. ELMER
By Watson, Cole, Grindle & Watson
ATTORNEYS

United States Patent Office 2,927,750
Patented Mar. 8, 1960

2,927,750
POWER OPERATED AIRCRAFT CONTROLS

Arthur Ernest Henry Elmer, Gloucester, England, assignor to British Messier Limited, Gloucester, England, a British company Application November 28, 1955, Serial No. 549,459

Claims priority, application Great Britain December 16, 1954

10 Claims. (Cl. 244—76)

This invention relates to power-operated flying control systems for aircraft of the kind comprising a movable control surface or other control means (hereinafter referred to generically as a "flight controller") subject to a reaction when displaced from a neutral setting, and of the kind in which the effort exerted by the pilot does not directly assist in overcoming such reaction.

In flying control systems of this kind various proposals have been made for providing a reaction to movements of the manually operated control member (hereinafter referred to generically as the "stick"), including spring devices and devices reacting proportionately to the cube of the airspeed.

The primary object of the present invention is to provide, in a system of the kind described, means reacting upon the stick proportionately to the reaction of the flight controller.

According to the invention a flying control system of the kind described comprises a "stick," a reversible servo motor and a stick-position signal-transmitter both coupled to the stick, a flight controller, a reversible servo motor and a flight-controller-position signal-transmitter both coupled to the flight controller, and means for energising both servo motors proportionately to the difference between the stick position signal and the flight controller position signal, the stick servo motor being energised less than the flight controller servo motor and in the sense opposing movement of the stick in the direction increasing such difference.

A further object of the invention is to provide, in a flying control system as defined in the preceding paragraph, means permitting operation of the flight controller by an automatic pilot device and means for maintaining the stick, while control is being affected by the automatic pilot, positionally in phase with the flight controller so that the pilot may satisfy himself at any time, by observing the movements of the stick, that the aircraft is suitably trimmed and that the system is operating normally. With such an arrangement the pilot will also be able to regain control with greater ease and certainty than with one in which the stick may be out of phase with the flight controller at the moment of changeover.

To this end, according to a feature of the invention the system includes means for energising the flight controller servo motor proportionately to the difference between a signal received from an automatic pilot and the flight controller position signal, and means for energising the stick position servo motor proportionately to the difference between the flight controller position signal and the stick position signal, the stick servo motor being thereby operated in the sense to move the stick to reduce such difference.

In a preferred arrangement according to the invention the servo motors are hydraulic jacks and the signals are direct or alternating electric currents transmitted by electrical transmission lines.

The accompanying drawing shows diagrammatically an example of a flying control system according to the invention.

At the transmitting end, the system comprises a pilot's control stick 1 coupled by a rod 2 to a hydraulic jack 3 and the moving contact 4 of a potentiometer 5 constituting a stick-position signal-transmitter. At the receiving end the system comprises a flight controller 6 coupled by a rod 7 to a hydraulic jack 8 and the moving contact 9 of a potentiometer 10 constituting a flight-controller-position signal transmitter. The hydraulic jacks 3 and 8 are supplied with fluid under pressure from a common source 11 through supply pipes 12 and 13 respectively, and after passing through the jacks and their associated control systems the fluid is returned to the source 11 through pipes 14 and 15 respectively. The jack 3 will conveniently be of substantially smaller piston diameter than the jack 8.

Fluid from the supply pipe 12 passes into the working chambers 20 and 21 of the jack 3 through restrictions 22 and 23 respectively and leaves these chambers through jets 24 and 25 respectively of an electrohydraulic relay 26 of the kind described more fully in patent specification Serial No. 306,995, now U.S. Patent No. 2,775,254. The relay 26 comprises a flap 27 under the control of a differential electromagnetic device 28 to which signals in the form of electric currents are transmitted through three lines R', N' and L' and it is to be understood that when current flowing in the line R' exceeds that flowing in the line L' the flap 27 is moved to the left, thereby increasing the obstruction of the jet 24 and reducing the obstruction of the jet 25 so that pressure rises in the chamber 20 and falls in the chamber 21 and a force directed towards the right is transmitted through the rod 2 to the stick 1. An "R" signal thus produces a force in the right hand direction, and conversely an "L" signal produces a force in the left hand direction as viewed in the drawing. The reference "N" denotes that that line is the neutral or return line in which the current is equal to the sum or difference of the currents in the lines R and L.

The control system for the flight controller jack 8 is similar to that described for the jack 3 except that it incorporates a second stage relay valve 30 to deal with the greater flow of fluid required to operate this jack. The valve 30 comprises a casing 31 and a valve member 32 provided with four lands 33, 34, 35 and 36. The four lands are of equal diameter and slide in a central part of the casing so that this latter is divided into five chambers 37, 38, 39, 40 and 41. The two ends of the valve member slide into end chambers 42 and 43 of the casing. The cross-sectional area of the end chambers 42 and 43 is conveniently equal to the annular cross-sectional area of the other chambers. Fluid from the supply pipe 13 is admitted directly to the middle chamber 39 and through restrictions 50 and 51 to the end chambers 42 and 43 respectively. From the middle chamber 39 fluid may pass by way of ports 52 and 53 controlled by the lands 34 and 35 to either working chamber 54 or 55 of the jack 8. When one such working chamber is connected to the supply by displacement of the valve member 32 from its neutral position the other chamber is connected by way of the port 52 or 53 to the valve chamber 38 or 40, these chambers being connected by pipes 56, 57 to the casing of an electro-hydraulic relay 60 and hence to the return pipe 15 connected to this latter. The working chambers 54 and 55 are also connected by pipes 61 and 62 respectively to the valve chambers 37 and 41 so that an endwise force is produced on the valve member 32 proportional to the force produced on the piston of the jack 8. To maintain the valve member 32 in a given state of adjustment the said endwise force upon it must be balanced by an opposite endwise force produced by a difference of pressure in the valve chambers 42 and 43, To this end fluid outlet pipes 63 and 64 from these chambers are connected to the jets 65 and 66 of the electro-hydraulic relay 60 so that movements of the flap 67 of this relay control the relative value of these pressures.

Movements of the flap 67 are produced by a differential electromagnetic device 70 to which signals in the form of electric currents are transmitted through three lines R″, N″, and L″ and it is to be understood that when current flowing in the line R″ exceeds that flowing in the line L″ the flap 67 is moved to the right, thereby increasing the obstruction of the jet 66 and reducing the obstruction of the jet 65 so that pressure rises in the chamber 43 and falls in the chamber 42. The valve member 32 is thus moved to the left from its neutral position so that the port 52 is opened to supply and the port 53 to drain. Pressure in the chamber 54 thus increases while that in the chamber 55 decreases, the pressure difference developed depending upon the reaction of the flight controller 6 to movement of the jack piston to the right. Since the pressures in the chambers 54 and 55 are also effective in the valve chambers 37 and 41 the pressure difference opposes movement of the valve member 32 to the left, and it follows that for any static condition the difference between the pressures in the valve chambers 42 and 43, and therefore the difference between the signal currents in the lines R″ and L″ are proportional to the reaction of the flight controller 6. It should be noted that in the notation used an "R" signal corresponds to a force on the jack piston in the right hand direction, and conversely an "L" signal corresponds to a force on the jack piston in the left hand direction.

The drawing shows a simplified arrangement of the electrical transmission system which will enable the principle of the invention to be more readily understood. The moving contact 4 of the potentiometer 5, constituting the stick-position signal transmitter, is connected to the line L′ of the electro-hydraulic relay 26 at the transmitting end and through contact 75 of a selector switch 76 to the line R″ of the electro-hydraulic relay 60 at the receiving end, while the moving contact 9 of the potentiometer 10, constituting the flight-controller-position signal transmitter, is connected to the line L″ of the electro-hydraulic relay 60 and to the line R′ of the electro-hydraulic relay 26.

When both the stick and the flight controller are in their neutral positions the pressures on the two sides of the piston of the jack 3 coupled to the stick are equal, the pressures on the two sides of the piston of the jack 8 coupled to the flight controller are equal, and the currents flowing through the pairs of lines R′ and L′ and R″ and L″ are equal. Supposing now the stick 1 is moved by the pilot towards the right, current in the lines L′ and R″ will increase proportionately to one another with the result that a certain force is developed upon the piston of the jack 8 towards the right to move the flight controller 6, and a proportional force is developed upon the piston of the jack 3 toward the left opposing the effort exerted by the pilot on the stick 1. The flight controller 6 will thus be moved together with the moving contact 9 of its position signal transmitter, the currents in the lines L″ and R′ being thereby increased proportionately in the sense tending to restore equality with the currents in the lines R″ and L′. Such equality is not however regained so long as the system is under load because of course the electro-hydraulic relay 60 has at all times to remain energised to an extent sufficient to balance the reaction of the flight controller 6, and since the electro-hydraulic relay 26 is always proportionately energised, the pilot's effort is always opposed by a force proportional to such reaction. Exactly similar considerations apply when the stick is moved towards the left.

Since the purpose of the system is to produce a greater effort on the flight controller than that exerted by the pilot on the stick it follows that the jack 3 must be energised to produce a correspondingly lesser thrust than the jack 8. This is preferably achieved by making the working displacement of the jack 3 less than that of the jack 8, but the reduction may also partly be obtained by proportionately reducing the power of the electric signals transmitted to the electro-hydraulic relay 26 or by suitable adjustment of its control characteristics relatively to the control characteristics of the combination of the electro-hydraulic relay 60 and the second stage valve 30.

Obviously the stick-position and flight-controller-position signals can be amplified before being applied to the electro-hydraulic relays, and the signal transmitters may be of alternating current type instead of the direct current potentiometer shown in the drawing.

The selector switch 76 permits the system to be controlled by signals received from an automatic pilot represented by a controller 77 and a signal transmitter in the form of a potentiometer 78 having a contact 79 moved by the controller. The contact 79 is connected to a second contact 80 of the selector switch 76 so that the line R″ can be connected either to the moving contact 79 of the automatic pilot signal transmitter or to the moving contact 4 of the stick-position signal transmitter. When the switch 76 is in its "automatic" setting the electro-hydraulic relay 60 is energised proportionately to the difference between the signal currents transmitted by the automatic pilot transmitter 78 and the flight-controller-position signal-transmitter 10, this difference being at all times proportional to the reaction of the flight controller 6. Supposing that, as a result of a movement to the right of the automatic pilot contact 79, the flight controller jacks 8 moves to the right, taking the contact 9 with it, a signal in the form of an increasing current flows through the line R′ of the electro-hydraulic relay 26 thus causing the piston of the jack 3 to move to the right carrying the stick 1 and the contact 4 with it. The current flowing along the line L′ therefore also increases, that is to say it changes in the sense reducing its difference relatively to the current flowing along the line R′. If the stick is left free it will therefore at all times take up a position in which the difference between the currents in the lines R′ and L′ is substantially zero, that is to say it will follow in phase with the movements of the flight controller 6. If the pilot restrains the stick so that control of the jack 3 is wholly by the flight controller position signal flowing through the line R′, he will feel forces on the stick corresponding in direction and proportional in magnitude to the aerodynamic reaction on the flight controller 6 and will thus be able to appreciate how the automatic pilot is operating and be able to take over control at a convenient moment by changing over the switch 76.

I claim:

1. A flying control system comprising in combination a manually operated control member, an electrical position signalling transmitter operatively connected thereto, an hydraulic piston-and-cylinder device also operatively connected thereto, an electro-hydraulic relay controlling the pressure in said device, a flight controller, a second electrical position-signalling transmitter operatively connected to the flight controller, a second hydraulic piston-and-cylinder device also operatively connected to the flight controller, a second electro-hydraulic relay controlling the pressure in said second device, each of said electro-hydraulic relays having a chamber for pressure fluid with a movable member for controlling the flow through said chamber to and from the associated piston-and-cylinder device and two coils which are supplied with current for controlling the movement of said member the arrangement being that when the coils are energized in balance with one another the movable member occupies a neutral position in which the associated piston-and-cylinder device is in equilibrium, means for supplying hydraulic pressure to the fluid chambers of said relays and through them to said piston and cylinder devices and electrical connections between the position-signalling devices and the relay coils whereby the two coils of each relay are balanced when the positions of the transmitters correspond.

2. A flying control system as claimed in claim 1 wherein between the second electro-hydraulic relay and the second piston-and-cylinder device there is interposed a piston valve actuated by the second electro-hydraulic relay for accentuating the force exerted upon the flight-controller.

3. A flying control system as claimed in claim 1 wherein the electrical position-signalling transmitters consist of potentiometers operated respectively by the manually-operated control member and by the flight-controller.

4. A flying control system as claimed in claim 1 wherein means are provided to connect an automatic pilot to one of the coils of the second electrically-operated relay for the purpose described.

5. In an aircraft having a flight controller subject when the aircraft is in flight to a reaction when displaced from a neutral setting, a power-operated flying control system comprising a first reversible servo motor and a flight controller position signal transmitter both coupled to the flight controller, a stick as hereinbefore defined, a second reversible servo motor and a stick position signal transmitter both coupled to the stick, means for controlling the loading of the second servo motor proportionally to the difference between the flight controller position signal and the stick position signal, a control signal transmitter, means for controlling loading of the first servo motor proportionally to the difference between the control signal and the flight controller position signal and means independent of the control signal for opposing the reaction to which the flight controller is subject.

6. A power-operated flying control system as claimed in claim 5 including a further control signal transmitter, and selecting means arranged to connect any selected one of said control signal transmitters with the means for controlling the loading of the first servo motor.

7. A power-operated flying control system as claimed in claim 6 wherein the stick position signal transmitter constitutes one of the control signal transmitters, said servo motor and means for controlling the loading of said servo motor being so dimensioned and connected that, when the stick position signal transmitter is connected with the means for controlling the loading of the first servo motor, and when the servo motors are loaded, the first servo motor is loaded to a greater extent than and simultaneously with the second servo motor.

8. A power-operated flying control system as claimed in claim 5 wherein the servo motors are hydraulic jacks.

9. A power-operated flying control system as claimed in claim 5 wherein the signals are electric currents transmitted by electric transmission lines.

10. In an aircraft having a flight controller subject when an aircraft is in flight to a reaction when displaced from the neutral setting; a power-operated flying control system comprising a first double acting hydraulic jack having a cylinder and a piston within said cylinder, said piston dividing said cylinder into two chambers one on either side thereof, a piston rod carried by and movable with said piston, a first electrical means transmitting signals dependent upon the flight controller position, said piston rod and electrical means being both coupled to said flight controller, a plurality of control signal transmitters, a first electro-hydraulic relay for controlling the loading of the said first jack in dependence upon the difference between the signal from said first electrical means and the signal from one of the control signal transmitters, means for selectively connecting one of said signal control transmitters to said first electro-hydraulic relay, a stick, a second double acting jack, a second electrical means for transmitting a signal in dependence upon the stick position, both said jack and said electrical means being coupled to said jack, said second electrical means incorporating one of said control signal transmitters, a second electro-hydraulic relay for controlling the loading of said second jack in dependence upon the difference between the signals from the first and second electrical means, a source of pressure fluid, and a drain, said first relay comprising a valve chamber, a pressure inlet to said valve chamber connected to said source of pressure fluid, two pressure outlets from said valve chamber, main conduit means connecting each of said two pressure outlets respectively to the two chambers in said first jack cylinder, two drain outlets from said valve chamber connected to drain, a piston valve in said chamber, lands on said piston valve, said valve and said lands dividing said chamber into at least three primary chambers and at least four auxiliary chambers, said lands on said valve obturating said pressure outlets when said valve means is in this neutral position, and, one of said primary chambers connecting one of said pressure outlets with said pressure and another of said primary chambers connecting the other of said pressure outlets to one of said drain outlets when said valve means is displaced from that said neutral position, said auxiliary chambers comprising opposed end chambers and two opposed subsidiary end chambers, fluid pressure in said chambers, the pressure in one said end chamber tending to move the valve in a direction opposite to that in which the pressure in the other end chamber tends to move the valve, the pressure in one of the subsidiary end chambers tending to move the valve in a direction opposite to that in which the pressure in the other subsidiary end chamber tends to move the valve, first auxiliary conduit means leading from said source of pressure to said end chambers, electrically operated pressure varying means for varying the difference in pressure in said end chambers depending upon the difference in signal from said first electrical means and the signal from the control signal transmitter to said relay, and second auxiliary conduit means, one from each of said end chambers leading to said electrically operating pressure means, a subsidiary pressure outlet from each of said subsidiary end chambers and subsidiary conduit means, each leading from one of said subsidiary pressure outlets from the main conduit means from the pressure outlet which would be connected to drain if the force due to pressure in the subsidiary end chamber overcame all the forces on said valve.

References Cited in the file of this patent

UNITED STATES PATENTS

| | | |
|---|---|---|
| 2,408,770 | Frische et al. | Oct. 8, 1946 |
| 2,475,484 | De Nise | July 5, 1949 |
| 2,686,896 | Matthews | Aug. 17, 1954 |
| 2,740,082 | Sedgfield | Mar. 27, 1956 |
| 2,760,739 | Reichert | Aug. 28, 1956 |